Figure 1:
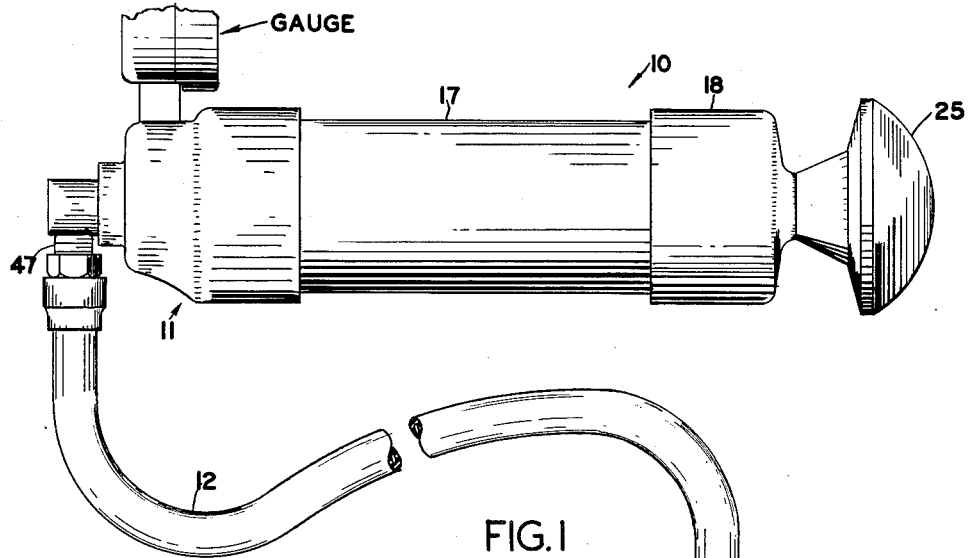

May 22, 1962 G. A. JOHNSON 3,035,436
ATTACHMENT ASSEMBLY FOR PRESSURE TESTER
Original Filed Sept. 16, 1959 2 Sheets-Sheet 1

INVENTOR.
GLEN A. JOHNSON
BY Harold B. Hood
ATTORNEY

May 22, 1962  G. A. JOHNSON  3,035,436
ATTACHMENT ASSEMBLY FOR PRESSURE TESTER
Original Filed Sept. 16, 1959  2 Sheets-Sheet 2

*INVENTOR.*
GLEN A. JOHNSON
BY *Harold B. Hood*
ATTORNEY

United States Patent Office 3,035,436
Patented May 22, 1962

3,035,436
ATTACHMENT ASSEMBLY FOR PRESSURE
TESTER
Glen A. Johnson, Connersville, Ind., assignor to Stant Manufacturing Company, Inc., Connersville, Ind., a corporation of Indiana
Original application Sept. 16, 1959, Ser. No. 840,444. Divided and this application Mar. 29, 1961, Ser. No. 99,162
8 Claims. (Cl. 73—40)

This is a division of my copending application Serial No. 840,444, filed September 16, 1959 for "Pressure Tester."

The present invention relates to an attachment assembly for a pressure tester and is primarily concerned with the provision of an improved assembly for use in testing the fluid tightness of closed vessels or systems, the pressures under which valved systems will react to relieve pressure and the effectiveness and proper calibration of closure caps for pressure systems.

The tester and attachment of the present disclosure have been designed primarily for use in connection with pressure type automobile engine cooling systems and the caps therefor; and they have been illustrated, and will be described, in that environment although it will be apparent to those skilled in the art that they may find uses in other environments.

Several different kinds of pressurized cooling systems, designed for operation under various pressure levels, are currently in use in the automobiles of various manufacture in the country; and each of them includes a radiator having a filler neck formed to provide a lip for securing engagement by an element of the cap and a closure seat axially spaced from that lip. The cap designed for use with any one of these systems conventionally includes a resiliently mounted valve element pressed against such seat, under yielding spring pressure, when the cap is so engaged with the filler neck. Ideally, the spring which so presses the valve against such seat is calibrated to hold the valve in sealing engagement with its seat so long as the pressure within the system does not exceed a predetermined value, but to yield whenever the pressure exceeds that value to prevent the accumulation of excessive pressure within the system. Since the cooling efficiency of any such system is optimum when the system is operated under the pressure for which that system is designed, it is obvious that if the cap spring becomes weakened or if the valve for any other reason permits the escape of pressure, the efficiency of the system will be lowered. Obviously, even minor leaks in such a pressurized system may be very important.

Thus, it is known that such systems should be frequently tested for leakage and that the caps for such systems, which, in effect, act as safety valves, should be frequently tested for leakage and for proper pressure calibration.

The attachment assembly of the present disclosure is designed for convenient, effective and accurate use with any conventional automobile cooling system and with the caps designed for use with such systems. The primary objects of the invention are to facilitate the application of a pressure tester to, and the use of a pressure tester with, cooling systems and caps of various constructions.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 2:
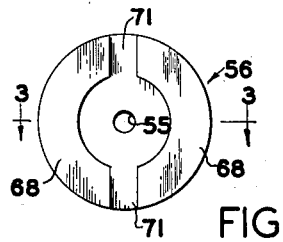
Figure 3:
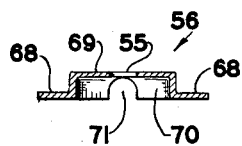
Figure 4:
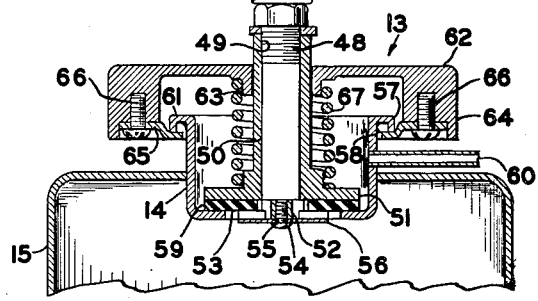
Figure 4:
Figure 5:
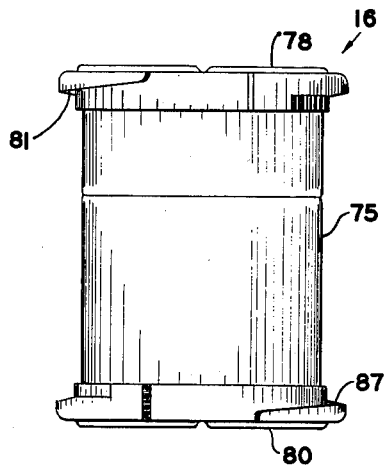
Figure 6:
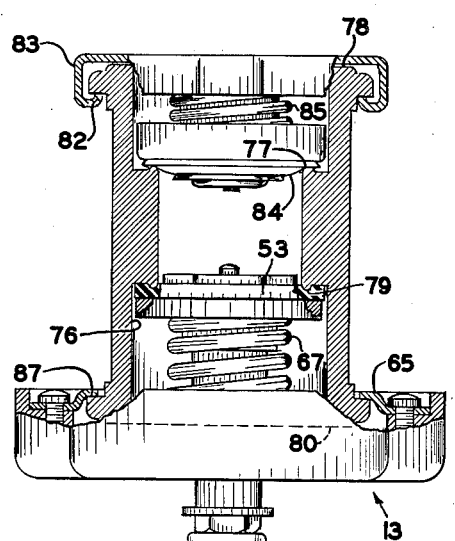
Figure 7:
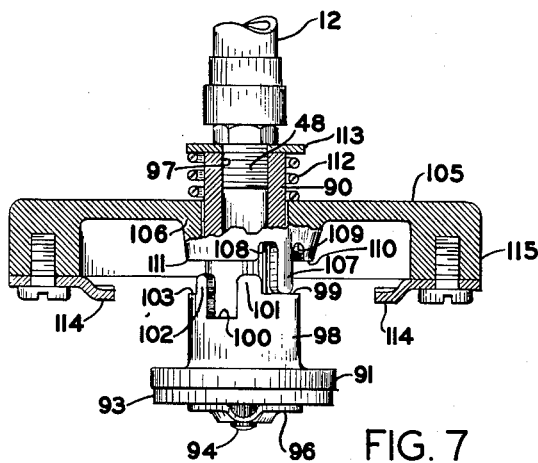
Figure 8:
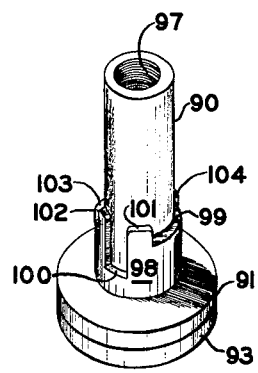
Figure 9:
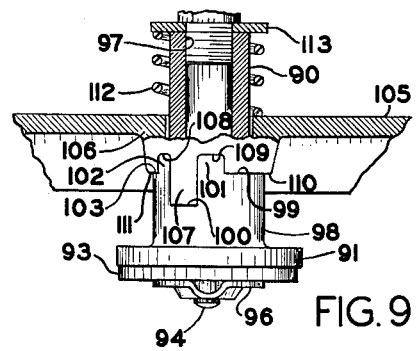

FIG. 1 is an elevation of a tester constructed in accordance with the present invention, in operative association with a fragment of a conventional automobile radiator filler neck, parts being broken away and parts being shown in section for clarity of illustration;
FIG. 2 is an enlarged bottom plan view of a baffle plate preferably used in the present attachment assembly;
FIG. 3 is a section taken substantially on the line 3—3 of FIG. 2;
FIG. 4 is a bottom plan view of the stem element of the attachment assembly shown in FIG. 1;
FIG. 5 is an elevation of an adapter designed for use with the tester disclosed herein;
FIG. 6 is a section through such an adapter, showing the attachment assembly of FIG. 1 and a closure cap operatively assembled therewith;
FIG. 7 is an elevation of a modified form of attachment assembly, partly in section;
FIG. 8 is a perspective view of an element of the assembly of FIG. 7; and
FIG. 9 is a fragmental view partly in section, showing the attachment assembly of FIG. 7 with its parts in a different position of adjustment.

Referring more particularly to FIGS. 1 to 4, it will be seen that the illustrated tester comprises a pump indicated generally by the reference numeral 10, an accumulator fitting indicated generally by the reference numeral 11, a flexible conduit 12 and an attachment unit or assembly indicated generally by the reference numeral 13. The assembly 13 is constructed and arranged for cooperative attachment to the filler neck 14 of a conventional automobile radiator 15, and is also associable, in a manner and for a purpose later to be described, with either end of an adapter fitting indicated generally by the reference numeral 16 (FIGS. 5 and 6).

The pump 10 comprises a cylindrical tubular body member 17 one end of which is semi-permanently closed by a cap 18. The other end of the cylinder carries the accumulator chamber 11 and the pump may be operated by a handle 25, all as described in my said copending application.

A nipple 47 at the one end of the flexible conduit 12, which may be a piece of rubber hose, provides a suitable connection between said hose and the discharge end of pump 10. A similar nipple 48 at the other end of the hose is designed to be threadedly received in one end 49 of a tubular stem 50 having an enlarged head 51 at its opposite end. As shown, a spider 52 integrally spans the passage through the stem 50, projecting beyond the distal face of the head 51 to center an annular gasket 53 which is adapted to bear against such distal head surface. A screw 54 penetrates a perforation 55 in a baffle plate 56 and enters a threaded central bore in the spider 52 to secure the gasket 53 and the plate 56 in place on the stem 50.

Conventionally, the filler neck 14 of an automobile radiator 15 is formed to provide at its outermost end a lip 57 defining diametrically-opposite, peripheral cam surfaces 58, and such a neck also provides a seat 59 axially spaced from the lip 57. An overflow pipe 60 usually communicates with the neck 14 between a seat 61 at the outermost end of the neck, and the seat 59.

A cap-like element 62 is mounted on the stem 50 for rotational and axial adjustment relative thereto and comprises a hub portion 63 closely surrounding the stem and a rim portion 64 radially spaced from the stem. Fingers 65, are secured to the rim portion 64 by means of screws 66, or other suitable fastening means, at diametrically spaced points for cooperative engagement with the cammed surfaces 58 of the lip 57. The parts are so proportioned and designed that, when the gasket 53 is seated on the seat 59, the fingers 65 may be engaged with said cam surfaces 58 to secure the element 62 to the filler neck 14, thereby, through a coiled spring 67 confined between the element 62 and the head 51, pressing the gasket 53 into sealing engagement with the seat 59. Now, when the pump is actuated, air will be pumped into the vehicle cooling system and will be prevented from escape therefrom by the engagement of the gasket 53 with the seat 59, so that pressure of any desired value can be built up in the cooling system, the pressure being readable on the illustrated gauge.

It is desirable, of course, to prevent liquid in the system from splashing into the tubular stem 50, and therefore I prefer to use the baffle plate 56 as means for securing the gasket 53 to the head 51. As is most clearly illustrated in FIGS. 2 and 3, said plate is formed to define rim portions 68 which lie in a common plane and are pressed, by the screw 54, against the outer surface of the gasket 53. A central, raised portion 69 defines a chamber 70 which is in open communication with the interior of the tubular stem through the spider ports; and raised tunnel or channel portions 71, communicating with the chamber 70 and extending radially therefrom, direct air supplied through the hose 12 substantially horizontally into the radiator 15, instead of permitting jets of air to be directed against the surface of liquid in the radiator.

The adapter 16 (FIGS. 5 and 6) comprises a cylindrical body 75 formed with an open passage 76 therethrough, said passage being interrupted by a seat 77 facing one end 78 of the adapter and by a seat 79 facing the opposite end 80 of the adapter. The seat 77 is axially spaced from the adapter end 78 by a distance which is equivalent to the distance between the seat 59 and the seat 61 of one conventional form of automobile radiator filler neck, while the seat 79 is axially spaced from the adapter end 80 by a distance which is substantially equal to the distance between the inner and outer seats of another conventional form of filler neck. These two filler neck forms are known in the trade as "short neck" and "long neck" radiators; and separate cap forms, suitably dimensioned, are conventionally supplied for cooperation with such separate neck forms. In FIG. 6, I have shown a "short neck" type of conventional cap, assembled with the adapter 16 and with the attachment assembly 13, in position to be tested. Cam surfaces 81 are provided on the body 75 adjacent the adapter end 78 to be engaged by the fingers 82 of such a conventional cap 83; and the parts are so proportioned and arranged that, when the cap is turned down on the adapter end 78, the gasket 84 of the cap 83 will be resiliently pressed against the seat 77 by the cap spring 85. It will be apparent that the association of the gasket 84 with the seat 77 will be in all respects analogous to the association of that gasket with the internal filler neck seat when the same cap is mounted on a short neck radiator.

The opposite end of the adapter is provided with similar cam surfaces 87; and the fingers 65 of the attachment assembly 13 may be engaged with those cam surfaces to assemble the tester with the capped adapter. When so assembled, the gasket 53 will be pressed against the seat 79 by the spring 67. Now, if the pump is actuated, air will be pumped into the space between the seats 77 and 79 to create a pressure which may be directly read on the illustrated gauge. If the cap 83 is a "7-pound" cap, the pump will be actuated until the gauge shows an accumulation of 7 pounds pressure within the adapter; and if the gauge does not fall, when operation of the pump is discontinued, it will have been demonstrated that the cap spring 85 has not become so weakened, and the gasket 84 has not become so worn or damaged, as to render the cap unsatisfactory for use. If, however, the pressure does fall, it will have been demonstrated that the cap 83 should be discarded.

If the pressure does not fall, the pump will be further actuated to pump more air into the adapter. If the pressure gauge continues to rise to a value substantially above 7 pounds before the gasket 84 is forced off its seat, it will have been demonstrated that the cap 83 is not the proper cap for use in a 7 pound pressurized cooling system; and that cap should be discarded, since its continued use in a 7 pound system would be dangerous.

If a "long neck" cap is to be tested, of course, the assembly 13 will be mounted on the end 78 of the body 75, and the cap to be tested will be mounted on the end 80 thereof. Since the spring 67 must necessarily be quite heavy, it has been found that it is difficult to mount the assembly 13 on the end 78 of the body 75 or on a "short neck" type of radiator, since the spring 67 must be quite substantially compressed in that operation. To obviate that difficulty, I have devised a modified form of attachment assembly which is illustrated in FIGS. 7, 8 and 9.

In the latter form of assembly, a hollow stem 90 is formed to provide an enlarged head 91 and a gasket 93 is supported on the distal face of that head through the medium of a baffle plate 96 and a screw 94 taking into a spider carried by that head, like the baffle plate 56, screw 54 and spider 52 of FIGS. 1 to 4. The opposite end of the stem is internally threaded as at 97 for reception of the nipple 48.

Adjacent the head 91, the stem 90 is formed with an enlarged section 98 formed to define a first abutment surface 99 and a second abutment surface 100 facing toward the first-named end of the stem. The surfaces 99 and 100 are angularly spaced from each other and a barrier element 101, projecting toward the upper end of the stem, is interposed between said surfaces. Preferably, but not necessarily, the section 98 further affords a surface 103 coplanar with the surface 99 and a barrier 102 like the barrier 101 is interposed between the surfaces 100 and 103; and a further abutment surface (not shown) coplanar with the surface 100 will be provided at a point diametrically spaced from the surface 100 with the barriers, only one of which, 104, is illustrated, interposed between said coplanar surface and the surfaces 99 and 103.

A cap-like element 105 is rotationally and axially adjustably mounted on the stem 90 and includes a hub portion 106 which closely surrounds the stem and a rim portion 115 radially spaced from the stem and carrying fingers 114 like the fingers 65.

The hub portion 106 is formed to provide an axially extending finger 107 which is adapted selectively to bear upon the abutment surface 99 or upon the abutment surface 100. The finger 107 is flanked by sockets 108 and 109 which, when the finger bears upon the surface 100, will receive barriers 102 and 101, respectively. Preferably, but not necessarily, the hub portion 106 defines abutment surfaces 110 and 111 which rest, respectively, upon the surfaces 99 and 103 when the finger 107 bears upon the surface 100. If the section 98 is symmetrical, as above described, a finger similar to the finger 107 and flanked by sockets similar to the sockets 108 and 109, will be provided at a position diametrically opposite the position of the finger 107.

A light spring 112 will preferably be confined between the member 105 and a washer 113 to hold the parts against rattling.

The parts are so proportioned and designed that, when the finger 107 bears against the abutment surface 99, and when the fingers 114 are engaged with the cam surfaces 87 of the adapter 16, the gasket 93 will be firmly pressed against the shoulder 79; and when the finger 107 bears against the abutment surface 100, engagement of the fingers 114 with the cam surfaces 81 of the adapter 16 will press the gasket firmly against the shoulder 77.

I claim as my invention:

1. In a device of the class described, a tubular stem having a radially-enlarged head at one end, a spider fixedly spanning the passage through said stem at the exposed face of said head, an annular gasket surrounding said spider and seated on said head face, a plate bearing on the exposed face of said gasket and cooperating therewith to define a radially-directed passage opening from the interior of said stem, a screw penetrating said plate and threadedly engaging said spider, a cap-like fitting loosely sleeved on said stem, and unidirectional axial-force transmitting means between said cap-like fitting and said stem.

2. The device of claim 1 in which said plate comprises rim portions disposed substantially in a common plane for engagement with said exposed gasket face, a central portion offset from said plane and defining a chamber communicating with said stem passage, and at least one tunnel portion opening from said chamber through said rim portions.

3. The device of claim 1 in which said force transmitting means is a coiled spring sleeved on said stem and confined between said cap-like fitting and said head.

4. In a device of the class described, a tubular stem having a radially-enlarged head adjacent one end, an annular gasket coaxially seated on the distal face of said head, and a cap-like fitting mounted on said stem for rotational and axial adjustment of said fitting relative to said stem, said fitting having a hub portion closely surrounding said stem and a rim portion provided with engaging means radially spaced from said stem, said stem and said fitting hub portion being provided with mutually-engageable, stepped abutment means so proportioned and arranged that, in one position of rotational adjustment of said fitting relative to said stem, said engaging means is located at a predetermined axial distance from said gasket and in another position of such rotational adjustment said engaging means is located at a greater axial distance from said gasket.

5. In a device of the class described, a tubular stem having a radially-enlarged head adjacent one end, an annular gasket coaxially seated on the distal face of said head, a cap-like fitting mounted on said stem for rotational and axial adjustment relative thereto, abutment means carried by said stem and providing a first abutment surface facing toward the other end of said stem and axially spaced a predetermined distance from said head and a second abutment surface facing toward said other stem end, peripherally offset from said first abutment surface and axially spaced a different distance from said head, and a finger projecting in an axial direction from said fitting and engageable alternatively with said abutment surfaces to limit selectively the approach of said fitting toward said head.

6. The device of claim 5 including barrier means interposed between said first and second abutment surfaces and projecting toward said other stem end beyond both of said abutment surfaces.

7. The device of claim 6 including spring means resiliently urging said fitting toward said head.

8. The device of claim 5 including spring means resiliently urging said fitting toward said head.

No references cited.